United States Patent
Halbauer et al.

(10) Patent No.: US 11,252,000 B2
(45) Date of Patent: Feb. 15, 2022

(54) DEVICE TO PROCESS DATA TO BE TRANSMITTED VIA A FIRST RADIO MODULE

(71) Applicant: Alcatel Lucent, Nozay (FR)

(72) Inventors: Hardy Halbauer, Stuttgart (DE); Mark Doll, Stuttgart (DE); Stephan Saur, Stuttgart (DE); Frank Schaich, Stuttgart (DE); Thorsten Wild, Stuttgart (DE)

(73) Assignee: Alcatel Lucent, Nozay (FR)

( * ) Notice: Subject to any disclaimer, the term of this patent is extended or adjusted under 35 U.S.C. 154(b) by 461 days.

(21) Appl. No.: 16/321,687

(22) PCT Filed: Jul. 27, 2017

(86) PCT No.: PCT/EP2017/068989
§ 371 (c)(1),
(2) Date: Jan. 29, 2019

(87) PCT Pub. No.: WO2018/029000
PCT Pub. Date: Feb. 15, 2018

(65) Prior Publication Data
US 2021/0288850 A1    Sep. 16, 2021

(30) Foreign Application Priority Data
Aug. 10, 2016 (EP) ................... 16290150

(51) Int. Cl.
*H04L 5/12* (2006.01)
*H04L 27/26* (2006.01)
(Continued)

(52) U.S. Cl.
CPC ........ *H04L 27/2602* (2013.01); *H04J 11/005* (2013.01); *H04L 5/0007* (2013.01);
(Continued)

(58) Field of Classification Search
CPC . H04L 27/2602; H04L 5/0007; H04L 5/0035; H04L 5/0048; H04L 27/2666; H04J 11/005
(Continued)

(56) References Cited

U.S. PATENT DOCUMENTS

2007/0217362 A1* 9/2007 Kashima ............... H04L 5/0041
370/330
2018/0026740 A1* 1/2018 Chen .................... G01N 33/487
370/328

FOREIGN PATENT DOCUMENTS

CN   102056345 A   5/2011
CN   102648645 A   8/2012
(Continued)

OTHER PUBLICATIONS

CA Office Action dated Mar. 5, 2021 in Chinese Application No. 201780049400.3.
(Continued)

*Primary Examiner* — Zewdu A Kassa
(74) *Attorney, Agent, or Firm* — Harness, Dickey & Pierce, P.L.C.

(57) ABSTRACT

It is proposed a device to process data to be transmitted via a first radio module of a radio communications network, in which data to be transmitted is mapped on subcarriers and in the radio module subsequently up-converted to a radio frequency higher than the subcarrier frequencies, wherein the subcarriers are grouped into frequency subbands, and wherein at least one subband is scalable with at least one subband parameter, wherein a subband parameter is in particular a subcarrier spacing, and wherein in at least one subband at least two different parameters, in particular subcarrier spacings, can be used.

18 Claims, 7 Drawing Sheets

Fig. 9

(51) Int. Cl.
*H04J 11/00* (2006.01)
*H04L 5/00* (2006.01)

(52) U.S. Cl.
CPC .......... *H04L 5/0035* (2013.01); *H04L 5/0048* (2013.01); *H04L 27/2666* (2013.01)

(58) Field of Classification Search
USPC ........ 375/262, 261, 260, 259, 316, 219, 195
See application file for complete search history.

(56) References Cited

FOREIGN PATENT DOCUMENTS

| | | |
|---|---|---|
| CN | 102804831 A | 11/2012 |
| CN | 105075167 A | 11/2015 |
| WO | WO-2016206763 A1 | 12/2016 |

OTHER PUBLICATIONS

Discussion Of Different Scaling Methods For NR Subcarrier Spacing, #GPP TSG RAN WG1 Meeting #85; Nanjing, China May 23-27, 2016, Document Code R1-163999.
Notification Of The Recording Of A Change PCT/IB/306 for PCT International Application No. PCT/EP2017/068989 dated Jun. 13, 2018.
Notification Concerning Submission, Obtention Of Transmittal Of Priority Document PCT/IB/304 for PCT International Application No. PCT/EP2017/068989 dated Sep. 6, 2017.
International Search Report PCT/ISA/210 for PCT International Application No. PCT/EP2017/068989 dated Oct. 23, 2017.
Written Opinion PCT/ISA/237 for PCT International Application No. PCT/EP2017/068989 dated Oct. 23, 2017.
CA Office Action for Chinese Application No. 201780049400.3 dated Aug. 3, 2021.

\* cited by examiner

DEVICE TO PROCESS DATA TO BE TRANSMITTED VIA A FIRST RADIO MODULE

CROSS-REFERENCE TO RELATED APPLICATIONS

This application is a national phase under 35 U.S.C. § 371 of PCT International Application No. PCT/EP2017/068989 which has an international filing date of Jul. 27, 2017 which claims priority to European Application No. 16290150.8, filed Aug. 10, 2016, the entire contents of each of which are hereby incorporated by reference.

FIELD OF THE INVENTION

The present invention relates to a device to process data to be transmitted via a first radio module.

BACKGROUND

Evolving radio communications standards like 5G permit an efficient multi-cell/multi-TP (transmission point) support of mixed numerologies, namely mixed carrier configurations, supporting signal processing both for data and pilot symbols thus including channel estimation.

5G in general and specifically 3GPP New Radio targets multi-service support within one carrier. As the different service use cases are very different from each other, they motivate different multi-carrier waveform parameters each.

SUMMARY

In view of this, it is an object of the present invention to provide an improved primary radio communications device.

It is proposed a device to process data to be transmitted via a first radio module of a radio communications network, in which data to be transmitted is mapped on subcarriers and in the radio module subsequently up-converted to a radio frequency higher than the subcarrier frequencies, wherein the subcarriers are grouped into frequency subbands, and wherein at least one subband is scalable with at least one subband parameter, wherein a subband parameter is in particular a subcarrier spacing, and wherein in at least one subband at least two different parameters, in particular subcarrier spacings, can be used, wherein the device comprises at least a processor and a memory, and is configured to: —receive at least one service request for the provision of at least one service, wherein a service request includes information related to at least one subband parameter; —align for at least a first period of time at least one subband parameter of a scalable subband with at least one corresponding subband parameter of a corresponding scalable subband used or to be used by a second radio module; —allocate for a received service request at least one of a time-frequency resource linked with at least one of the at least one scalable subband with an aligned subcarrier parameter suitable to provide the service request, and map data to be transmitted and related to the service request to subcarriers of a subband corresponding to the allocated time-frequency resource.

The aligned subcarrier parameter provides that mutual interference between neighbouring transmission points of devices regarding reception and transmission of data is reduced. The proposed device provides means to achieve a better match between the devices in each transmission time interval.

According to an embodiment the device is being configured to: —determine data to be transmitted to a user equipment, —allocate the determined time-frequency resource, —modulate the data with a selected carrier configuration, in particular the at least one subband parameter, and—transmit the data via the allocated time-frequency resource.

Therefore, data is transmitted according to a coordinated carrier configuration scheme.

According to an embodiment the device is being configured to: —receive data via a time-frequency resource and—de-modulate the received data with the selected carrier configuration, in particular the at least one subband parameter.

Therefore, data is received according to a coordinated carrier configuration scheme.

According to an embodiment the device is being configured to: —receive the aligned carrier configurations used by a further device from the further device and/or from a coordinator device. This explicit coordination of carrier configurations achieves that mutual interference can be reduced in a specific frequency range.

According to an advantageous embodiment the aligned carrier configurations are at least partly statically linked with the plurality of time-frequency resources.

The static link between time-frequency resources and a respective carrier configuration provides a pre-configuration and limits the problem of mutual interference to the remaining part of dynamically assignable frequency ranges.

According to an embodiment the device is being configured to: —determine an alignment priority; —align the plurality of carrier configurations in dependence on the alignment priority.

This priority scheme provides a further degree of freedom regarding the determination of the aligned carrier configurations.

According to an advantageous embodiment the device is configured to: determine the alignment priority in dependence on the service request and/or a transmission mode for the data.

By determining the alignment priority in dependence on the service request certain secondary radio communications devices can be preferred over other secondary radio communications devices.

By determining the alignment priority in dependence on the transmission mode for the data, certain transmission and reception modes like coherent joint transmission or inter-cell interference cancellation benefit.

According to an embodiment the service request comprises a signal-to-noise ratio from the user equipment, wherein the device is configured to: —determine the alignment priority in dependence on the received signal-to-noise ratio.

Considering the signal-to-noise ratio enables to adjust the alignment priority individually for each secondary radio communications device and its operating point with regard to signal-to-noise ratio.

According to an embodiment the device is being configured to: —determine a plurality of carrier configurations, —sort the plurality of carrier configurations in a frequency direction according to a sorting scheme, the sorting scheme related to a parameter of the carrier configurations.

This implicit coordination scheme provides an alignment of carrier configurations without the need for further interfaces and respective communications overhead.

According to an advantageous embodiment the service request is received during a connection setup of the user equipment.

Therefore the device can align the carrier configuration on connection setup. With each further connection setup of further user equipments the alignment can be adapted to the load of the device.

According to an advantageous embodiment a radio communications network comprises: the device and the second device.

According to an advantageous embodiment the radio communications network comprises a user equipment which is configured to: —transmit the service request to the first and second devices, —receive first data from the device via a first time-frequency resource, —receive second data from the second device via a second time-frequency resource, —de-modulate the first data according to a first carrier configuration, in particular a first subband parameter, —de-modulate the second data according to a second carrier configuration, in particular a second subband parameter.

The user equipment is therefore prepared to receive data from different devices with different carrier configurations.

According to a further aspect, a coordinator device for a radio communications network is proposed. An interface is configured to: receive service requests and/or alignment requests from a plurality of neighbouring primary radio communications devices; the coordinator device comprises alignment means configured to: align a plurality of carrier configurations in dependence on the service requests and/or in dependence on the alignment request; the interface is being further configured to transmit the plurality of aligned carrier configurations to the plurality of neighbouring primary radio communications devices.

DESCRIPTION OF THE EMBODIMENTS

Figure 1:
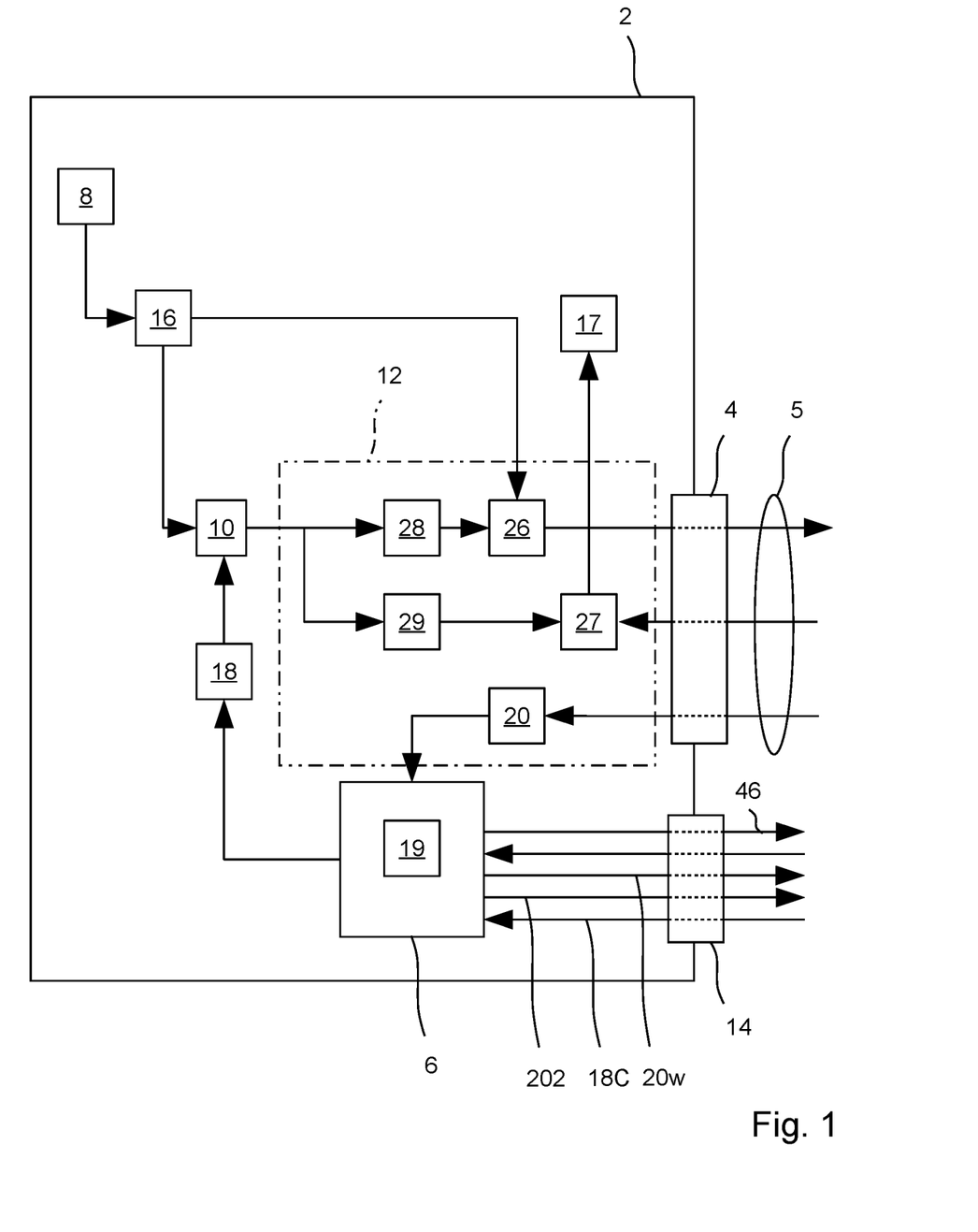
FIG. 1 shows a schematic block diagram of a primary radio communications device.

FIG. 1 shows a schematic block diagram of a primary radio communications device 2. The primary radio communications device 2 comprises a radio module 4, an alignment means 6, a processor 8, the scheduling means 10 and a transceiver 12. Furthermore, according to an embodiment the primary radio communications device 2 comprises a further interface 14 to communicate through a further communication channel as outlined to FIG. 3. According to an embodiment the interface 14 is omitted as outlined to FIG. 4.

The processor 8 determines or selects data 16 to be transmitted via the radio module 4. For the transmission of the data 16 the alignment means 6 and the scheduling means 10 are operated. The alignment means 6 receives a service request 20 from a secondary radio communications device via a radio channel 5. In dependence on the service request 20 the alignment means 6 determines a plurality of carrier configurations 18. The determined plurality of carrier configurations 18 reflect the service requirements of the secondary radio communications devices being connected to the primary radio communications device 2.

The alignment means 6 aligns the plurality of carrier configurations 18 by means of exchanging respective alignment information through the interface 14. The aligned carrier configurations 18 or respective alignment information can be received and/or transmitted by means of the interface 14 from and/or to a neighbouring primary radio communications device 2. Furthermore, the aligned carrier configurations 18 or respective alignment information can be received by means of the interface 14 from a coordinator device being described in FIG. 9. Neighbouring primary radio communication devices 2 provide overlapping radio coverage with respect to at least one secondary radio communications devices. According to the alternative embodiment, the interface 14 is omitted and the alignment of the plurality of carrier configurations 18 is established implicitly without further information from the neighbouring primary radio communications device 2.

The alignment means 6 is preferably embodied as an encoded machine-executable program, which is stored on a machine-readable medium. In the event of a demand for coordination and for alignment of the carrier configuration 18, in particular the subcarrier parameter, the program is loaded from the machine-readable medium and is executed by a processor. The program also can be loaded on start-up of the respective system or processor and can remain in an idle state until the coordination demand is triggered. However, the alignment means 6 can be also embodied as a hardware component.

The interface 14 is intended to exchange information between primary radio communications devices 2 even on different hierarchy levels like primary radio communications devices 2 for a pico- or micro-cell. According to an embodiment the interface 14 is an LTE X2 interface.

The radio module 4 receives the service request 20 from the secondary communications device. The service request 20 received comprise, e.g., a low latency requirement, an extended radio coverage requirement or a high velocity support requirement of the respective secondary radio communications device. Therefore, the service request 20 comprises for example a preferred carrier configuration out of the set of carrier configurations 18 or a preferred scheduling scheme or a preferred transmission priority or the like.

The scheduling means 10 schedules the data 16 to be transmitted via the radio module 4. The scheduling means 10 determines or selects a time frequency resource 26 which is linked with a selected carrier configuration 28 for the transmission of data 16. The scheduling means 10 schedules the data 16 to be transmitted according to a scheduling scheme which comprises postponing the transmission of the data 16 when not enough time frequency-resources 26 are available for the modulation of the data 16 with the selected carrier configuration 28. The transceiver 12 is configured to modulate the data 16 with the aligned and selected carrier configuration 28.

The transceiver 12 is preferably embodied as a hardware component. The transceiver 12 relies on a waveform which is able to multiplex different air interface configurations, in particular different carrier configurations 18, in particular different subband parameters, on the same carrier. Therefore, the transceiver 12 is able to modulate a plurality of data 16 on the same carrier using different subband parameters at the same point in time. The transceiver 12 can be also termed modulation means. Furthermore, the modulation scheme used by the transceiver 12 can comprise Quadrature Phase-Shift Keying, Quadrature amplitude modulation or the like.

The radio module 4 is configured to transmit the data 16 via the allocated time frequency resource 26. The time-frequency resource 26 is selected or determined by the scheduling means 10 in dependence on the load of the primary radio communications device 2 and in dependence on the requirements defined by the service request 20 (e.g. latency, velocity support). The carrier configuration 28 is selected or determined by the service request 20 and is used by the scheduling means 10 for transmission of the data 16 on the time-frequency resource 26.

The scheduling scheme applied by the scheduling means 10 comprises: determining a number of time frequency resources not being allocated and being suitable for transmitting the data 16 in dependence on the service request 20. In dependence on the number of time-frequency resources being already allocated the allocation of the time frequency resource 26 is postponed with the aim to allocate the time frequency resource 26 linked with the selected carrier configuration 28 and therefore fulfilling the requirements of the service request 20 of the secondary radio communications device. The service request 20 is received during a connection setup of the secondary radio communications device. Furthermore, further service request 20 may be received from the secondary radio communications device after the connection setup to update e.g. requirements included in one or more of its preceding service requests 20.

According to an embodiment the scheduling means 10 uses strictly the determined or received carrier configurations 18. According to an alternative embodiment the scheduling means 10 may alter the carrier configurations 18 by providing feedback to the alignment means 6. According to a further embodiment the scheduling means 10 is able to depart from the prescribed carrier configurations 18 for example in a certain frequency region.

The scheduling means 10 is preferably embodied as an encoded machine-executable program, which is stored on a machine-readable medium. In the event of a demand for scheduling data to be transmitted, the program is loaded from the machine-readable medium and is executed by a processor. The program can be also loaded on start-up of the respective system or processor and can remain in an idle state until the scheduling demand is triggered. However, the scheduling means 10 can be also embodied as a hardware component.

According to a further embodiment during connection setup no service request 20 is received. After the connection setup the service request 20 is received to update the carrier configurations 18. According to an embodiment the alignment means 6 determines an alignment priority 19 in dependence on the service request 20 and/or in dependence on a determined transmission mode for the data 16 and/or in dependence on a received capability of the secondary radio communications device. The alignment means 6 determines the plurality of carrier configurations 18 in dependence on the alignment priority 19. Therefore, a first number of frequency resources are reserved for a transmission and/or reception of data by using a first carrier configuration in dependence on a high priority. A second number of frequency resources are reserved for a transmission and/or reception of data by using a second carrier configuration in dependence on a second highest priority.

According to an embodiment the service request 20 comprises a signal-to-noise ratio from the secondary radio communications device and the alignment means 6 determines the alignment priority 19 in dependence on the received signal-to-noise ratio. In this case the service request 20 is a channel measurement report, which is transmitted a plurality of times during the communication.

According to an embodiment the alignment means 6 determines and/or updates the carrier configurations 18 without being triggered by a service request 20. For example, if a connection parameter of a connection with a secondary radio communications device passes a threshold value the carrier configurations 18 are updated and/or an alignment request 202 is determined and transmitted to the coordinator device. Another example of the connection parameter comprises channel state information, statistical measures thereof, or the packet loss rate. For example, when the determined velocity of a secondary radio communication device surpasses a predefined threshold at which the experienced Doppler shift and spread surpasses the maximum value optimally supported by the subcarrier spacing of the currently selected carrier configuration, the next larger subcarrier spacing from the set of available carrier configurations 18 will be chosen.

According to an embodiment the alignment priority 19 is determined according to the determined transmission mode according to table 1. According to the interference rejection a spatial suppression of interference brings benefits also in non-aligned carrier configurations.

According to inter-cell interference cancellation frequency-domain based interference cancellation techniques are used preferably in cells of interest. A cell comprises at least two primary radio communications devices 2.

According to the coherent joint transmission an alignment of carrier configurations across a plurality of primary radio communications devices 2 is necessary.

TABLE 1

| Transmission mode | alignment priority |
|---|---|
| Blanking of time-frequency resources | 0 (lowest alignment priority) |
| Transmission from only one primary radio communications device | 0 |
| Interference rejection combining (multi-cell linear MMSE, Minimum Mean Square Error, receive combining) | 1 |
| Inter-cell interference cancellation | 2 |
| Coordinated multi-point techniques, CoMP, like Coherent joint transmission or reception | 3 (highest alignment priority) |

The alignment priority 19 therefore provides benefits with respect to expected throughput of data and spectral efficiency or cell edge data rate. For the determination of the alignment priority 19 the service request 20 comprises a capability indication with regard to the respective transmission mode as outlined in table 1.

The alignment priority 19 is determined in dependence of a signal-to-noise ratio which is received via the service request 20. The alignment means 6 determines the expected spectral efficiency for each of the aligned carrier configurations. With a high value for the determined spectral efficiency a high alignment priority for the transmission of data 16 is assigned to each one of the aligned carrier configurations 18.

The scheduling means 10 selects a carrier configuration 29 for the reception of data 17. Data 17 is received via the radio module 4 and is being de-modulated according to the carrier configuration 29.

The carrier configurations 28 and 29 refer to at least one subband parameter of the carrier and/or of a modulation/demodulation scheme. The carrier configurations 28 and 29 can be also referred to as numerology. The carrier configurations 28 and 29 comprise and may differ in at least one of the following subband parameters:

symbol duration,
subcarrier spacing,
time overhead,
time overhead type (e.g. zero postfix or cyclic prefix)
windowing or filtering parameters (length and/or actual coefficients),
waveform parameters,
DFT-spreading, active or not, or any other sort of 2-D thus time-frequency transformation applied prior to multi-carrier modulation, e.g. for processing the signal in the delay-Doppler domain.

According to an embodiment the received service request 20 is forwarded in form of a forwarded service request 20w to the coordination device through the interface 14.

According to an embodiment the alignment means 6 determines an alignment request 202 in dependence on the service requests 20 received. The alignment request 202 reflects the present state of received service requests 20 in the form of a required distribution of carrier configurations in the available time frequency space. As a response to the alignment requests 202 the primary radio communications device 2 receives the carrier configurations 18C from the coordination device. If the carrier configurations 18C are received, the carrier configurations 18 are replaced by the received carrier configurations 18C.

Figure 2:
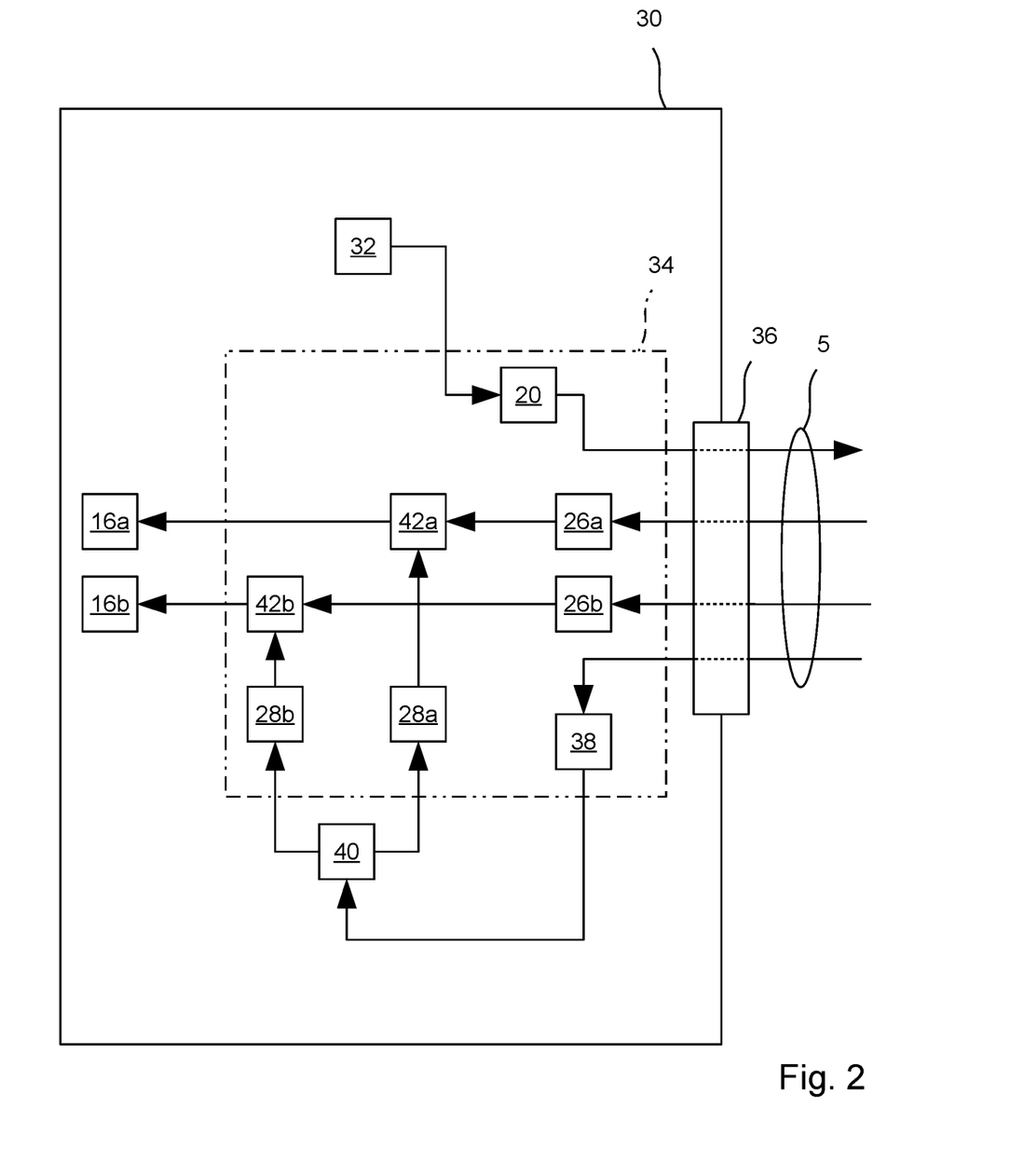
FIG. 2 shows a schematic block diagram of a secondary radio communications device.

FIG. 2 shows a schematic block diagram of the secondary radio communications device 30. The secondary radio communications device 30 comprises a processor 32 to generate the service request 20 during the connection setup, wherein the service request 20 is modulated by means of a transceiver 34 and transmitted via a radio module 36. An indication 38 is received via the radio module 36 from the primary radio communications device 2. An indication means 40 determines carrier configurations 28a and 28b in dependence on the indication 38. According to an embodiment the indication 38 is a broadcast message from the primary radio communications device 2. According to another embodiment the indication 38 is a pre-configured data resource configuration which is received only by a group of secondary radio communications devices 30.

Via the radio module 36 first data 16a and second data 16b are received via respective time frequency resources 26a and 26b, wherein the first and second data 16a and 16b are de-modulated by means of respective de-modulation means 42a and 42b using the carrier configurations 28a and 28b, respectively. The first and second carrier configurations 28a and 28b may differ. First and second data 16a and 16b may originate from different primary radio communication devices 2.

The de-modulation means 42a and 42b are preferably embodied as a hardware component. The de-modulation means 42a and 42b rely on a waveform which is able to multiplex different air interface configurations, in particular different carrier configurations 18, in particular different subband parameters, on the same carrier. Therefore, the de-modulation means 42a and 42b is able to de-modulate a plurality of data 16a, 16b received via the same carrier using different subband parameters at the same point in time. Furthermore, the de-modulation scheme used by the de-modulation means 42a, 42b can comprise Quadrature Phase-Shift Keying, Quadrature amplitude de-modulation or the like.

Figure 3:
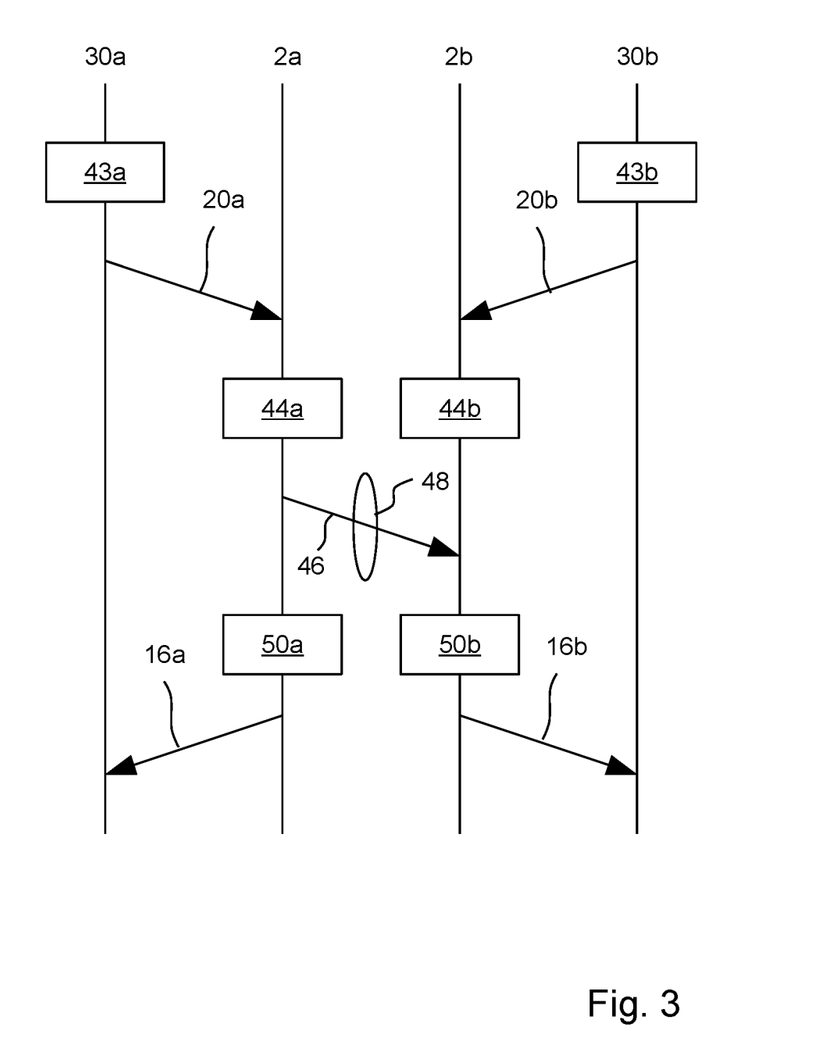
FIGS. 3 and 4 show a schematic sequence diagram, respectively.

According to an embodiment the secondary radio communications device 30 may also modulate the data 16a, 16b with the carrier configurations 28a, 28b, respectively, and transmit the data 16a and 16b to the primary radio communications devices 2a, 2b, respectively, as shown in the following figure.

FIG. 3 shows a schematic sequence diagram. It is shown a communication scheme with neighbouring first and second primary radio communications device 2a and 2b and first and second secondary radio communication devices 30a and 30b. The first and second secondary radio communication devices 30a and 30b transmit a service request 20a and 20b to at least one of the primary radio communications devices 2a and 2b, respectively. According to steps 43a and 43b the service requests 20a and 20b are determined, respectively. According to a respective step 44a and 44b a connection from the primary radio communication devices 2a, 2b to the secondary radio communication devices 30a, 30b are determined based on the service requests 20a, 20b, respectively.

In the example the first primary radio communications device 2a determines in step 44a a plurality of carrier configurations 18 and transmits these carrier configurations 18 by means of a coordination message 46 through a communication channel 48 to the second primary radio communications device 2b. Therefore, the second primary radio communications device 2b aligns the carrier configurations 18 to be used to the carrier configurations 18 used by the first primary radio communications device 2a.

After this explicit coordination of the carrier configurations 18 each one of the first and second primary radio communications devices 2a, 2b schedules the data 16a, 16b to be transmitted to the respective secondary radio communications devices 30a, 30b in the scheduling step 50a, 50b, respectively. The scheduling decision is transmitted via a respective indication, e.g. via a downlink control information, DCI, to the secondary radio communications devices 30a, 30b, respectively. After the transmission of the indication the data 16a can be transmitted from the first primary radio communications device 2a to the first secondary radio communications device 30a. Also data 16b can be transmitted from the second primary radio communications device 2b to the second secondary radio communications device 30b by using a selected one of the aligned carrier configurations 18. The indication comprises a scheduling decision of the respective scheduling means 10.

It is assumed that the first and second primary radio communications devices 2a and 2b are neighbouring devices providing intersecting radio coverage areas. Mutual interference between the first and second primary radio communication devices 2a, 2b is therefore minimised or at least properly shaped for transmit and receive processing in an advantageous manner (e.g. in terms of complexity) by the proposed alignment of carrier configurations 18 and the transmission of data by means of the aligned carrier configurations 18.

Inter-cell interference is present regardless of the carrier configuration. Different carrier configurations distribute interference by inter-carrier interference over more subcarriers, which makes processing on receiver side harder (e.g. regarding complexity).

Figure 4:
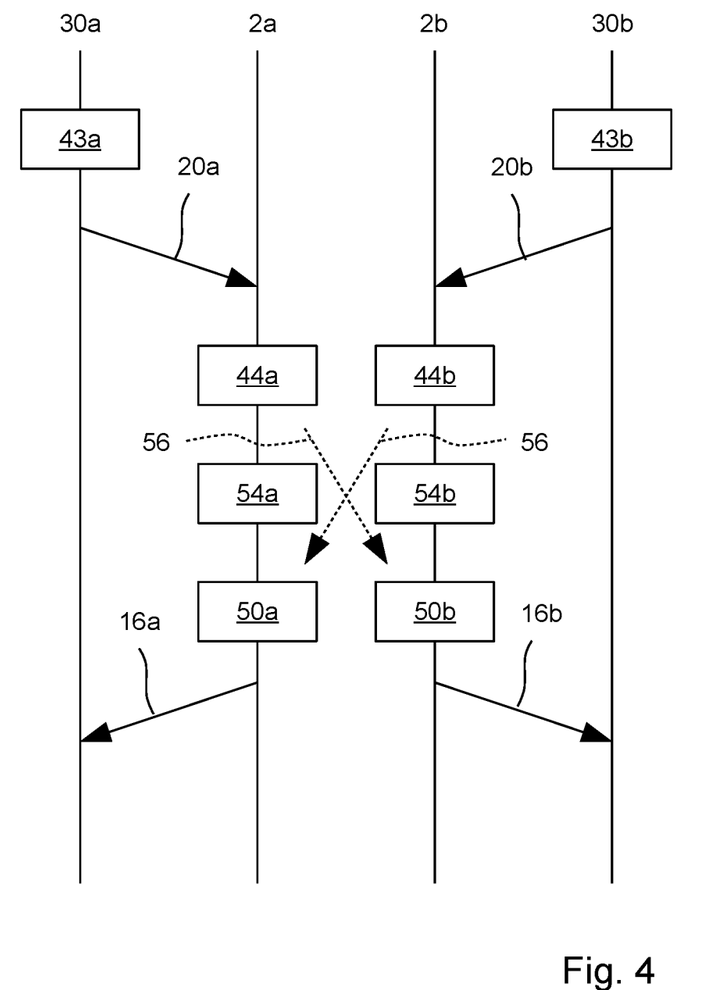

FIG. 4 shows a schematic sequence diagram. With difference to FIG. 3 FIG. 4 provides an implicit coordination which is established by the steps 54a and 54b. According to the step 54a, 54b the different carrier configurations are sorted along a frequency direction. The implicit coordination or alignment of the plurality of carrier configurations 18 is performed by the respective alignment means 6 independently without explicit information from the neighbouring primary radio communications devices 2 as shown by the arrows 56.

Figure 5:
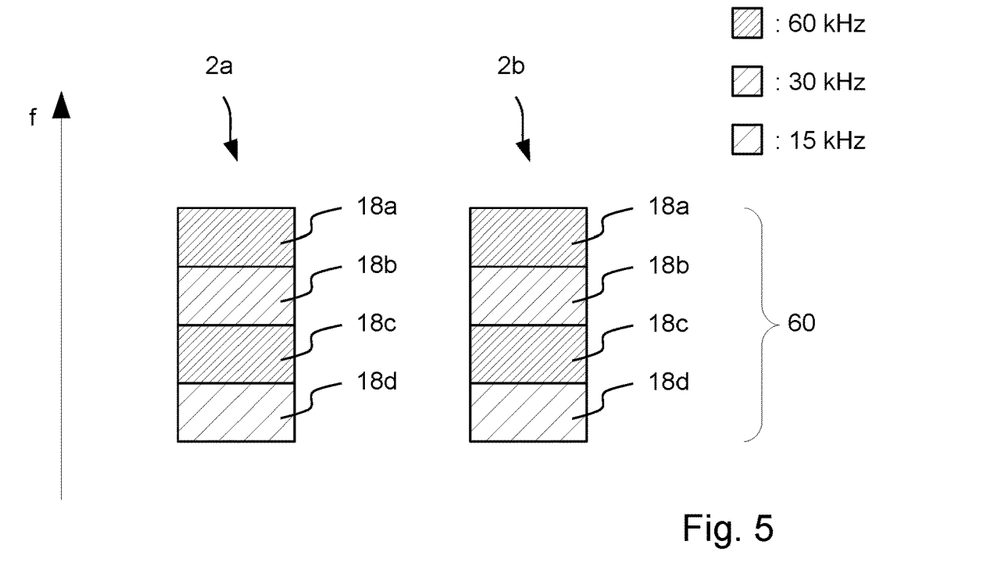
FIGS. 5 to 7 show a schematic frequency diagram, respectively.

FIG. 5 shows a schematic frequency diagram according to which an explicit coordination or explicit alignment of carrier configurations 18 is established for neighbouring primary radio communications devices 2. Accordingly the neighbouring primary radio communications devices 2a, 2b can schedule the transmission of the respective data 16 by a respective modulation according to the aligned carrier configurations 18a to 18d. Therefore, the explicit coordination of carrier configurations between primary radio communications devices 2 can be established over a frequency range 60.

Figure 6:
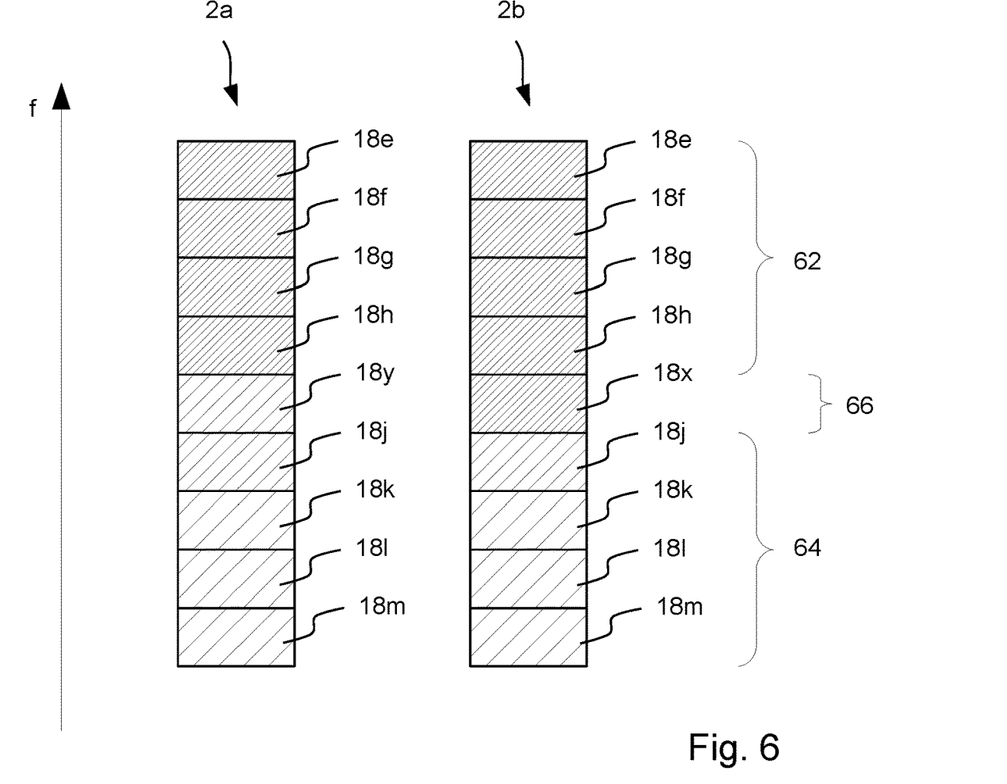

FIG. 6 shows a schematic frequency diagram. It is shown a result of an implicit coordination or an implicit alignment of carrier configurations 18 as outlined in FIG. 4. In a first frequency range 62 the carrier configurations 18e to 18h of the neighbouring primary radio communications devices 2 correspond. The same applies to a frequency range 64.

In the frequency range 66 the carrier configurations 18x and 18y differ and do not correspond. The corresponding carrier configurations 18 in the frequency ranges 62 and 64 are established by sorting the carrier configurations 18 in an ascending or descending order with respect to a parameter of the carrier configurations 18. For example the subcarrier spacing as a parameter of the carrier configurations 18 is used in the example for sorting the carrier configurations 18 in an ascending order in frequency direction. With ascending frequency f the subcarrier spacing frequency is ascending. Therefore, the probability of receiving data 16 in the same type of carrier configuration 18 by means of the secondary radio communications device 30 is increased. The implicit alignment of carrier configurations 18 makes no use of the interface 14.

In FIG. 6 a full load example is shown. According to a further embodiment of an implicit alignment different starting frequencies are determined for respective carrier configuration properties. Determining a certain carrier configuration at a specific frequency range therefore depends on the starting frequency. Accordingly, during the setup or update of the plurality of carrier configurations 28 a first frequency range is filled with first carrier configurations with a first property starting at a first starting frequency. A second frequency range is filled with second carrier configurations with a second property starting with a second starting frequency. Different primary communication devices 2a and 2b use different values for the starting frequency in order to avoid mutual interference.

Figure 7:
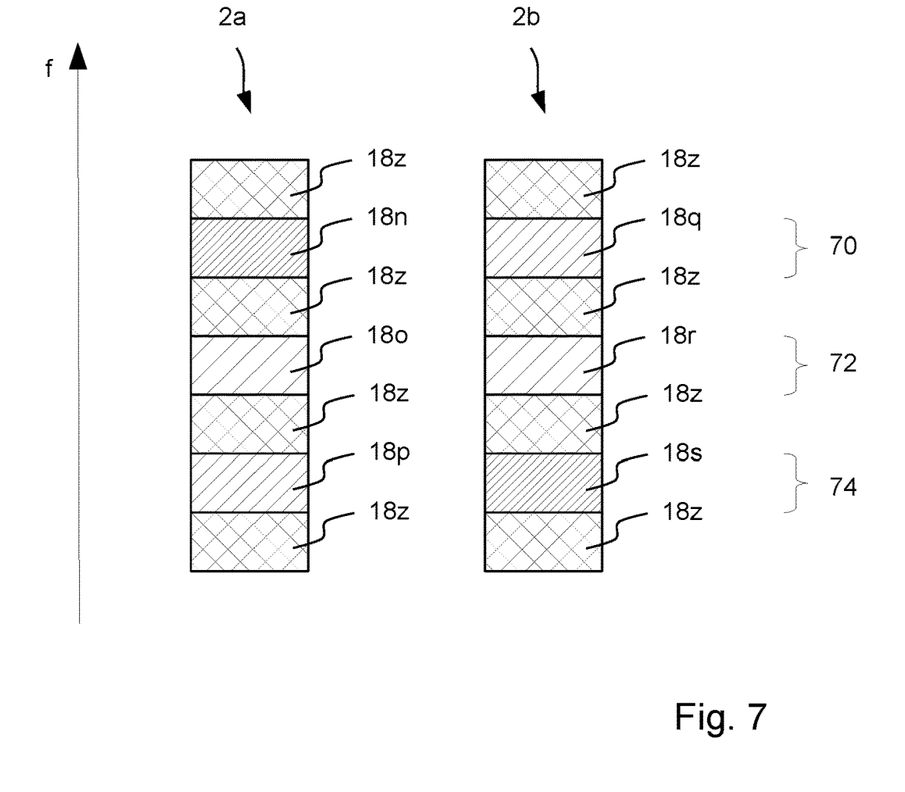

FIG. 7 shows a schematic frequency diagram. According to a static alignment of carrier configurations 18 a plurality of carrier configurations 18z are fixed/statically aligned with regard to the frequency location. This configuration of the fixed carrier configurations 18z may be applied system-wide or may be coordinated between the primary radio communications devices 2.

Figure 8:
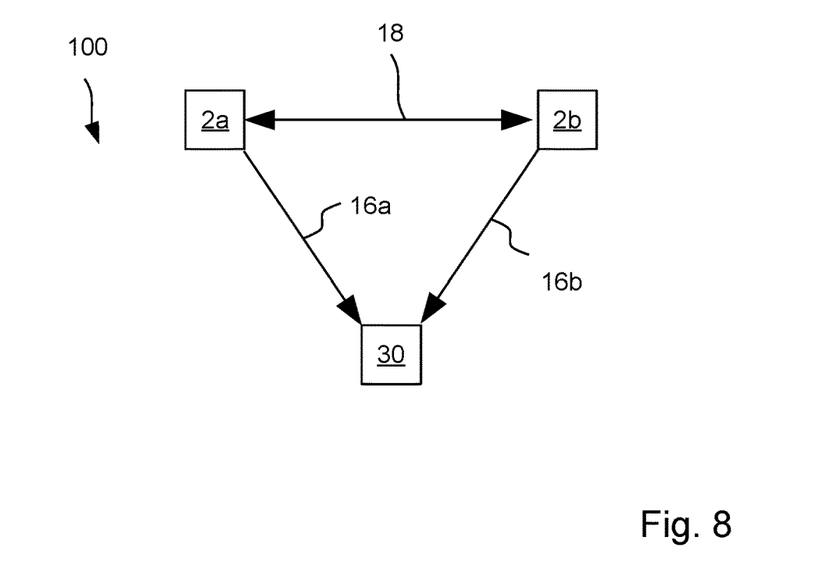
FIGS. 8 and 10 show schematically a radio communications network, respectively.

The further carrier configurations 18n to 18s residing between the fixed carrier configurations 18 in the frequency ranges 70, 72 and 74 can be freely aligned between the neighbouring primary radio communications devices 2 to provide a further degree of freedom regarding the needs of the secondary radio communications devices 30 being attended by the first radio communications devices 2 for the transmission of data 16. This free alignment of the further carrier configurations 18n to 18s can be semi-static and may change on a slow timescale in the order of hundreds of a transmission time interval (TTI). According to dynamic alignment the further carrier configurations 18n to 18s may change on a time scale in the order of one single TTI. In 3GPP LTE a TTI corresponds to 1 ms FIG. 8 shows a radio communications network 100 comprising the first primary radio communications device 2a and the second primary radio communications device 2b, which are implicitly or explicitly coordinated with regard to of a plurality of carrier configurations 18. During a connection setup of the secondary radio communications device 30 these carrier configurations 18 are coordinated with the aim to provide aligned carrier configurations for transmitting data 16a and 16b to the secondary radio communications device 30. In the case of a different alignment being required later, because different service or traffic types are used or the propagation conditions have significantly changed, a reconfiguration information is triggered by control signaling in form of a further service request 20. It is assumed that the primary radio communications devices 2a, 2b provide overlapping radio coverage for the secondary radio communications device 30.

According to a first embodiment the first and second primary radio communication devices 2a and 2b represent individual base stations or individual transmission points like a remote radio head. The secondary radio communications device 30 represents a user equipment or machine-type equipment. Accordingly the data 16a and 16b are transmitted in a downlink direction. The neighbouring primary radio communications devices 2 therefore provide overlapping radio cells.

In an alternative embodiment the first and second primary radio communication devices 2a and 2b represent user equipments or machine equipments. The secondary radio communications device 30 represents an individual base station or individual transmission point like a remote radio head. Accordingly the data 16a and 16b are transmitted in an uplink direction.

Figure 9:
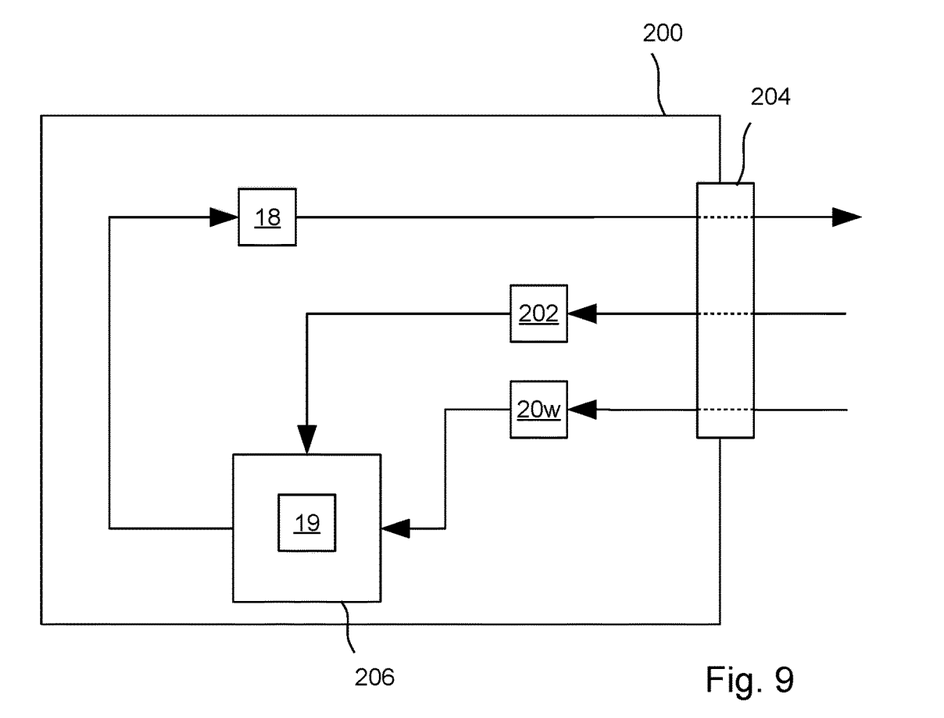
FIG. 9 shows a schematic block diagram of a coordinator device.

FIG. 9 shows a schematic block diagram of a coordinator device 200. The coordinator device 200 comprises an interface 204 to receive alignment requests 202 and/or service requests 20 from primary radio communication devices 2. An alignment means 206 of the coordinator device 200 comprises the same or at least overlapping functionality as the alignment means 6 of the primary radio communications device 2.

The interface 204 is intended to exchange information between the coordinator device 200 and at least one primary radio communications device 2. According to an embodiment the interface 204 is an LTE X2 interface.

The alignment means 206 determines the alignment priority 19 in dependence on the alignment requests 220 and/or service requests 20. The alignment priority 19 can be determined in dependence on a received capability, wherein the secondary radio communications device 30 signals the capability in form of a device class or a feature to the primary radio communications device 2. The alignment means 206 determines the plurality of carrier configurations 18 in dependence on the alignment priority 19. Therefore, a first number of frequency resources are reserved for a transmission and/or reception of data by using a first carrier configuration in dependence on a high priority. A second number of frequency resources are reserved for a transmission and/or reception of data by using a second carrier configuration in dependence on a second highest priority.

The plurality of carrier configurations 18 is transmitted via the interface 204 to the plurality of primary radio communications devices 2.

Figure 10:
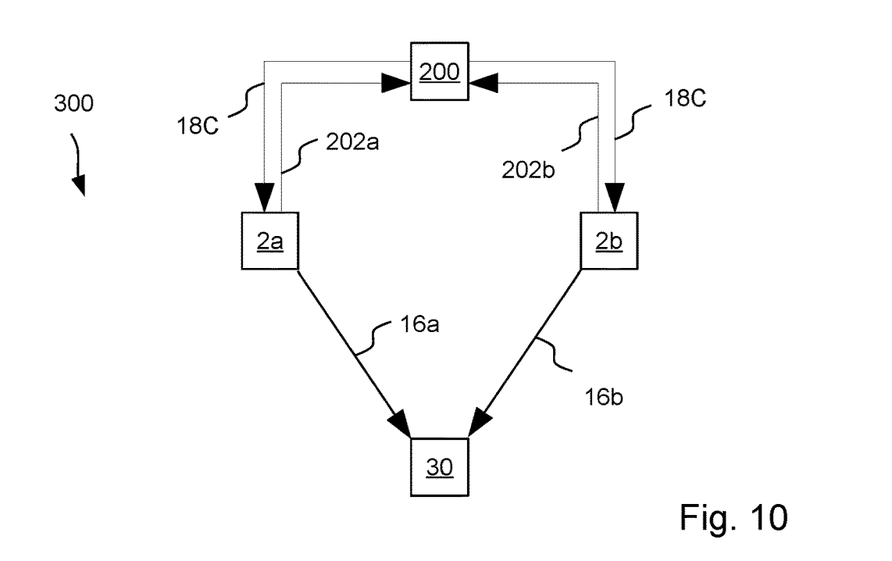

FIG. 10 shows schematically a radio communications network 300. The coordinator device 200 receives alignment requests 202a and 202b from the primary radio communications devices 2a and 2b. The primary radio communications devices 2a and 2b receive the carrier configurations 18 from the coordinator device 200.

The aforementioned embodiments relate in particular to a device (2, 2a, 2b) to process data (16) to be transmitted via a first radio module (4) of a radio communications network (100), in which data to be transmitted is mapped on subcarriers and in the radio module (4) subsequently up-converted to a radio frequency higher than the subcarrier frequencies, wherein the subcarriers are grouped into frequency subbands (18a, . . . , 18z), and wherein at least one subband is scalable with at least one subband parameter, wherein a subband parameter is in particular a subcarrier spacing, and wherein in at least one subband at least two different parameters, in particular subcarrier spacings, can be used, wherein the device (2) comprises at least a processor and a memory, and is configured to:

- receive at least one service request (20, 20a, 20b) for the provision of at least one service, wherein a service request includes information related to at least one subband parameter;
- align (6) for at least a first period of time at least one subband parameter of a scalable subband with at least one corresponding subband parameter of a corresponding scalable subband used or to be used by a second radio module;
- allocate for a received service request (20, 20a, 20b) at least one of a time-frequency resource (26) linked with at least one of the at least one scalable subband with an aligned subcarrier parameter suitable to provide the service request, and map data to be transmitted and related to the service request to subcarriers of a subband corresponding to the allocated time-frequency resource.

The aforementioned device to process data is in particular a processing part of a base station. The base station could be an LTE eNodeB, a 5G transmission point, a WiFi access point, or else. The base station is in particular suitable to serve a radio cell and to connect user equipment inside the cell to the radio network. The base station is e.g. implemented as a stand-alone equipment including e.g. a processing part and a radio interface, or as a processing part and a remotely located so called RRH (Remote Radio Head). The processing part is e.g. implemented using a processor and a memory. The processor is implemented using e.g. a DSP, FPGA, or the like or a combination thereof. The memory is implemented using e.g. a RAM, ROM, DDR, Flash memory, or the like, or a combination thereof. The memory stores e.g. computer readable instructions, thus instructions executable by the processor. The processing part processes data to be transmitted to the user equipment. The processing includes the steps necessary to fulfil the requirements set by the radio network. The processing part thus includes e.g. a channel coder to code the data to be transmitted, an interleaver, a constellation mapper, a serial-to-parallel converter, a linear pre-coder, a carrier mapper to map the data and the pilots to be transmitted on subcarriers, an inverse FFT modulator, a cyclic prefix adder, a parallel-to-serial converter, and a framing module to add the preamble and to construct the frame to be transmitted. The aforementioned modules could be placed in serial order. Some modules might be duplicated to enable parallel processing, some modules might not be used or replaced by others dependent on the technology used. The functions of the modules relate to digital signal processing and could thus be implemented using a processor like a digital signal processor, or the like. At least some of the functions relate to baseband processing and could thus be implemented using a transceiver, e.g. a baseband transceiver. The radio module is e.g. a radio interface, or a remotely located so called RRH (Remote Radio Head). The constellation with a RRH is often used in connection with a so called NFV (Network Functions Virtualization) implementation, where a substantial part of processing is centralized in a server farm with a plurality of processors and a plurality of memory, and the radio specific up-conversion, the antenna and the digital-to-analog converter for data transmission in downlink to the user equipment and the analog-to-digital converter for receiving data from the user equipment in uplink is remotely located. The radio module is also called radio frontend and includes e.g. a digital-to-analog converter, a low-pass filter, a mixer, a local oscillator, a power amplifier and an antenna. The local oscillator generates the radio frequency which is mixed on the processed data. The aforementioned modules could be placed in serial order. Some modules might be not be used or replaced by others dependent on the technology used. For MIMO or massive MIMO some modules need to be duplicated, e.g. a plurality of antennas is used instead of one and corresponding amplifiers, etc. User equipment (UE) could be implemented as a device with a radio interface, e.g. smartphone, tablet, smartwatch, sensor, actuator, equipment inside a vehicle, machine-to-machine equipment, or else. The radio network is e.g. an OFDM (Orthogonal Frequency Division Multiplex) type network, e.g. UF-OFDM, F-OFDM, ZT-s-OFDM, P-OFDM, FC-OFDM, or another multi-carrier network, e.g. FS-FBMC, QAM-FBMC, etc. E.g. QAM—Quadrature Amplitude Modulation and/or QPSK—Quadrature Phase Shift Keying are used as modulation technique. The radio network allocates resources using a scheduler/the scheduling means 10 and a time-frequency-resource grid, a t-f-resource. The t-f-resource includes time slots and associated subcarriers. The subcarriers are e.g. grouped in frequency subbands. A subband is assigned at least one subband parameter. A subband parameter is e.g. subcarrier spacing, other parameters are e.g. symbol duration, time overhead, time overhead type like zero postfix or cyclic prefix, windowing or filtering parameters. Dependent on the assigned or selected parameters the subband is characterized for a specific transmission type and is in particular suitable for the transmission of specific services. A service is e.g. eMBB (enhanced mobile broadband), mMTC (massive machine-type-communication), URLLC (ultra reliable low latency communication), vehicle-to-vehicle communication, voice, video, etc. An allocated resource block thus assigns a dedicated time slot associated with one or more subcarriers or a subband to a data packet. A resource block assigns one time slot to a subcarrier. A time slot is e.g. called a TTI (transmission time interval). The period of time could e.g. be one or more time slots. Data and control signals are transmitted using physical channels, e.g. physical downlink shared channel, physical downlink control channel, common control physical channel. Further data and control signals could be transmitted using broadcast channel, paging channel, multicast channel. Some parameter values are e.g. subcarrier spacing: 15 kHz, 30 kHz, or 60 kHz; cyclic prefix: 4.7 us, 2.4 us, 1.2 us, or 0.6 us; subframe: 500 us, 250 us, 125 us, or 67.5 us; symbols per subframe: 7 or 6; FFT size: 128, 256, 512, or 1024; scalable bandwidth:

1.25 MHz, 2.5 MHz, 5 MHz, 10 MHz, or 20 MHz; TTI 1 ms, or ⅛ ms. The alignment of a subband parameter of a subband to a subband parameter of a subband of another radio antenna includes e.g. the following constellation: A first base station serves a first cell and is connected with a first UE, and a second base station serves a second cell and is connected to a second UE. The second base station is a neighboring base station to the first one, their cells could overlap, the second base station could also be a small cell located inside the cell of the first base station. The first base station has e.g. a first subband, e.g. a 720 kHz band at a certain frequency position, and is enabled to configure in a flexible way one or more parameters of the subband. Such parameter is e.g. the subcarrier spacing. E.g. the base station can configure the subband to operate with a 15 kHz spacing, a 30 kHz spacing, or a 60 kHz spacing. The second base station has e.g. also the first subband, e.g. a 720 kHz band at the same certain frequency position, and is also enabled to configure in a flexible way one or more parameters of the subband. Such parameter is e.g. also the subcarrier spacing. E.g. the second base station can configure the subband to operate with a 15 kHz spacing, a 30 kHz spacing, or a 60 kHz spacing. To reduce interference between the base stations and/or the UEs, the first and the second base station align their subcarrier spacing in the specified subband. This alignment can be performed in different ways. One way is coordination by a master-slave procedure. The first base station is acting as a master, assigns the subcarrier spacing to the first subband, and informs the second base station, e.g. via a X2 interface, of the assignment. The second base station acts as a slave and adapts its assignment to the assignment of the first base station. Example 1: first base station assigns 30 kHz subcarrier spacing, second base station assigns 30 kHz subcarrier spacing. As subcarrier spacing is only one parameter and base stations need to fulfil several requirements, e.g. service requests, the overall load of the base station, etc. the second base station may not use the identical subcarrier spacing, but a subcarrier spacing closer to the best choice, e.g. first base station assigns 60 kHz subcarrier spacing, second base station assigns 30 kHz subcarrier spacing, and not 15 kHz. Another way of alignment is e.g. a coordination device located outside of the base stations, or e.g. in NFV a centralized scheduler in the server farm. The coordination device receives information from the base stations which enables the device to provide alignment information to the base station. Such alignment information helps the base station to align the specific parameters without exchanging information with the neighbor base station. The alignment information could include a sorting algorithm, which could e.g. be provided by the device via a backhaul connection during operation or the base station could be preconfigured with such algorithm. The algorithm could be updated from time to time. The base station could e.g. instruct the base station to use higher subcarrier spacings, e.g. 60 kHz, for lower frequency subbands and lower subcarrier spacing, e.g. 15 kHz, for higher subbands, and 30 kHz in-between. A base station could also be preconfigured with specific subbands where assigning different subcarrier spacings is not allowed and others where subcarrier spacing assignment is allowed. For the latter one the active coordination or the sorting procedure could be implemented. Assignments for downlink and uplink traffic may follow the same, a similar or a different rule.

The choice of multi-carrier numerology is driven by the propagation environment and the services to be supported: Short symbol durations and thus larger subcarrier spacings are desirable for low latency and high velocity use cases. Long symbol durations and thus smaller subcarrier spacings are attractive for high delay spreads and multicast/broadcast services. The answer of LTE design to these issues was a compromise numerology that traded off the objectives of all purposes (with the exception of MBMS where a long CP could be time multiplexed). This compromise has its limitations with respect to supporting newer traffic requirements, such as high velocities and low latencies. A frequency multiplex is better suited when combining URLLC and NR MBMS, as the time multiplex would compromise the low latency targets. When trying to aim for a single numerology per carrier with a compromise numerology for URLLC, the TTI will contain only very few OFDM symbols, which especially in the uplink either creates pilot overhead- or PAPR issues.

An attractive possibility for NR is when the network can pick the appropriate multi-carrier parameters for the respective propagation environment and service needs of each user (to keep the effort required for this functionality at a reasonable level a code-book based approach is to be preferred, i.e. based on measurements, delivered service and device characteristic the respective table entry is selected). In principle, different optimized configurations (e.g. in terms of numerology) for the broad range of new radio use cases can be addressed by:

1. using different carriers, each with its adjusted parameter setting (subcarrier spacing) bundled by carrier aggregation.

2. or by relying on a waveform which is able to multiplex different air interface configurations for the different use cases side-by-side on the same carrier in an FDMA manner.

The second option provides multiplexing gains, as the load per service typically varies over time and space. Resources allocated to different type of services can be dynamically shifted, generating increased flexibility. This ensures a more efficient use of carriers. While the multiplexing of different services, each with optimized configurations, is aligned with respective requirements and contains the advantages mentioned above, basic CP-OFDM (including state-of-the-art solutions with a full band carrier filter for LTE spectral mask fulfilment) would significantly suffer from inter-carrier interference due to poor in-carrier spectral localization.

The above described aspects suggest that user-specific numerology is highly desirable for new radio. For high velocity and low latency use cases, performance benefits of the numerology adaptation are: Compared to the LTE frame structure based on 15 kHz subcarrier spacing, for high velocities a NR adjustment with 30 kHz subcarrier spacing could prevent a factor 3 loss in spectral efficiency. On the other hand 15 kHz was still better for low velocities, motivating a switching of numerology.

A second example is an uplink low latency setup when considering pilot overhead and pilot boosting. Here 30 kHz subcarrier spacing could show around 20% higher spectral efficiency, compared to 15 kHz. Both examples thus show use-case-specific and propagation-condition-specific adaptation of numerology is beneficial.

It is proposed a UE/service-specific numerology by taking into account complexity and testing burden.

A prerequisite for mixed numerologies is a waveform which enhances basic OFDM in terms of in-carrier spectral localization. Otherwise, when using only basic OFDM, there may be strong drawbacks, which can be observed in the waveform comparison results. As mentioned, filtering and windowing are both options. Subband-filtering has been shown as the stronger alternative in terms of spectral efficiency, compared to windowing, which also holds when the impact of the power amplifier is modelled.

In principle we have several options to deal with several different numerologies inside the same carrier: The extreme cases are: Either we allow each resource block to have a different numerology. Or we split the carrier into one contiguous portion for each appearing numerology. The former alternative comes with high signalling overhead and non-negligible inter-carrier interference or guard band overhead. The second alternative does not allow for much flexibility in resource usage. For this reason we suggest to consider alternatives in between: A tiling concept.

The basic idea of the tiling concept is the following: A tile can be seen as a configurable larger resource group chunks with homogeneous numerology or other PHY/MAC parameters (such as TTI length, waveform parameters, such as active DFT-spreading, or tight/relaxed time-frequency alignment). Each tile may have different numerology/parameters. This enables NR to provide a configurable air interface. Example tile sizes are e.g. 720 or 1440 kHz in frequency and 1 ms in time. A tile is defined as a time-frequency region of constant size. The radio frame consists of consecutive tiles in time- and frequency direction. A tile is characterized by the numerology parameters used TTI length Symbol length and subcarrier spacing Number of subcarriers per resource block Derived parameters are: Number of symbols per TTI, number of TTIs per tile, number of subcarriers per tile and number of resource blocks per tile.

A tile consists of consecutive resource blocks in time- and frequency direction

A resource block is the smallest possible allocation unit

Each 5G profile (set of supported tile types etc.) can use its own types of tiles, i.e. a new profile can provide a new tile type appropriate for a certain purpose not known today.

Two different tiles types; one with and one without CSI-RS

As C-RS is dropped, the question is: how good are the CSI-RS for measurements, how often are they needed. Baseline solution could be one CSI-RS per tile.

The basic usage of tiling could be that the scheduler pre-allocates resource tiles, according to service and user demands in a time structure given by the tile sizes, e.g. 1 ms. Each tile uses its own TTI length and numerology from a predefined set. The "1-D" scheduling is then carried out within the tiles. In case the pre-allocated URLLC tiles are not sufficient, a pre-emption is possible.

It is proposed: Grouping of resources into tiles with same numerology should be considered as a solution for enabling mixed numerology and a configurable air interface.

This section deals with the options for the level of multi-cell coordination of tiles which are available and its potential handling (Multi-cell aspects of the tiling concept). Different service requirements (e.g. low latency, high speed) lead to different parameterization of the time-frequency allocation of the user (e.g. different subcarrier spacings and symbol lengths, respectively). During the connection setup, a user informs the network about its service requirements. This set of requirements and the derived physical parameters are the basis of an implicit (without signaling exchange between TPs) or explicit (with signaling exchange between TPs) coordination between neighbouring TPs with the aim to minimize mutual interference between cells. The assignment of radio resources for the UEs is based on the coordination. As an example: UEs with a certain numerology are preferably scheduled in a certain frequency sub-band. The principle applies for both uplink and downlink.

A first set of devices requests means for coverage extension, e.g. smart meters installed in the basement of buildings. The derived physical parameter needed for these devices is a long OFDM-symbol duration. Simultaneously, a second set of devices requests stringent means for ultra-low latency, e.g. for road safety messages. The derived physical parameter needed for these devices is a short OFDM-symbol duration. Both sets of devices indicate their respective requirement during connection set-up. Hence all TPs are aware of the requirements of their respective connected devices and configure the assigned radio resources accordingly.

As a next step, the TPs exchange the service triggered configuration of the connection. Explicit coordination can be established via backhaul. The aim of this explicit coordination is that all TPs schedule UEs utilizing the same numerology, e.g. signals with 30 kHz subcarrier spacing in one particular frequency subband, as far as this is possible. Please note that the number of allocations with a certain numerology may be different for each TP. The coordination includes therefore the possibility to postpone the service of a certain UE in order to achieve a better match between the TPs in each Transmission Time Interval (TTI).

Implicit multi-site coordination of time-frequency chunks can be established by sorting. As one option the coordination of time-frequency chunks is done implicitly, i.e. without explicit exchange of the current configuration between different TPs. This can be easily achieved by sorting the allocations e.g. according to increasing subcarrier spacing. All transmission points transmit the allocations with 15 kHz subcarrier spacing (blue boxes in FIG. 3) preferably in one certain part of the system bandwidth, and all allocations with 30 kHz subcarrier spacing (orange boxes in FIG. 3) preferably in another part of the system bandwidth. As consequence, it is more like that different TPs send or receive allocations of the same type in one particular frequency-sub-band. Also, with the same principle, the probability that numerologies causing maximal mutual interference are transmitted in the same frequency sub-band can be minimized.

Partial pre-configuration of time-frequency chunks is explained in the following. As it is very likely that in all cells a certain amount of "default" numerologies useful for a broad range of services, e.g. with 15 kHz subcarrier-spacing, will be required, it may be useful to allocate these allocations semi-statically throughout the multi-cell deployment. In other words, all TPs apply the same pattern of the "default" numerology. This would limit the addressed problem of mutual interference to the remaining part of the allocations, that can be still dynamically assigned in each cell with the required configuration (in our example 15, 30, or 60 kHz).

Numerology alignment priority table for each multi-cell coordination technique:

| Technique | Numerology Alignment priority | Remark |
|---|---|---|
| Blanking of resources | 0 (none) | |
| Single cell transmission | 0 (none) | |
| Interference rejection combining | 1 (low) | Spatial suppression of interference also brings benefits in non-aligned |

| Technique | Numerology Alignment priority | Remark |
|---|---|---|
| (Multi-cell linear MMSE receive combining) | | numerology |
| Inter-cell interference cancellation | 2 (high-should be aligned) | Frequency-domain based IC techniques are only reasonable when the same numerology is used in the cells of interest. Time-domain IC techniques are possible without numerology alignment. |
| Coherent joint transmission | 3 (highest-must be aligned) | Coherent combining of symbols across different cells demands same numerology |

Different levels of coordination of numerology among cells are possible. The need for coordination depends on the processing technique.

It is proposed the following: New Radio should provide possibilities of at least partial numerology coordination via the inter-base-station interface (the NR variant of the X2 interface).

In the following Multi-cell reference signal- and sounding design is explained. In the mixed numerology case the properties of pilot sequences across multiple cells when different numerologies are used in different cells is an issue which needs to be addressed. When certain well defined cross-correlation properties are anticipated, e.g. supported by Zadoff-Chu sequences, there needs to be a proper way of alignment between different cells.

An appealing solution is when CSI-RS are time multiplexed with control/data transmissions. The numerology of CSI-RS is aligned among TPs, while the control/data/DMRS numerology is chosen independently and is not aligned among TPs except when e.g. UE signals is transmitted by multiple TPs (DL CoMP) or to simplify SIC processing (as discussed above). Even within a single TP different control/data numerologies may by applied on the same time frequency resources, e.g. when different UEs are served simultaneously on the same resources using spatial multiplexing (MU-MIMO). The time multiplexing is motivated from the target of avoiding inter-(sub-)carrier interference, as CSI-RS and data numerologies may differ. Note: Especially when multiple CSI-RS numerologies are applied within a multi-TP system, there may exist boundaries between regions applying a specific CSI-RS numerology. Therefore having TPs with different CSI-RS numerology on the very same time frequency resource, although not preferred, may still occur, but with the drawback of hampering inter-TP channel measurements.

It is proposed the following: New Radio should provide possibilities of reference- and sounding symbol numerology alignment across multiple cells. For those reference and sounding symbols time-multiplexing with the option of full numerology alignment across different cells should be considered.

In this description it is discussed implications on frame design stemming from mixed numerologies. Use cases and potential benefits were discussed, as well as multi-cell aspects including reference symbol- and sounding design. The resulting proposals and observations can be summarized as follows:

UE/service-specific numerology provide benefits by taking into account complexity and testing burden.

Grouping of resources into tiles with same numerology is considered as a solution for enabling mixed numerology and a configurable air interface.

Different levels of coordination of numerology among cells are possible. The need for coordination depends on the processing technique.

New Radio should provide possibilities of at least partial numerology coordination via the inter-base-station interface (the NR variant of the X2 interface).

New Radio should provide possibilities of reference- and sounding symbol numerology alignment across multiple cells. For those reference and sounding symbols time-multiplexing with the option of full numerology alignment across different cells should be considered.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The functions of the various elements shown in the FIGS., including any functional blocks labelled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the FIGS. are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

The invention claimed is:

1. A device to process data to be transmitted via a first radio module of a radio communications network, in which data to be transmitted is mapped on subcarriers and in the first radio module subsequently up-converted to a radio frequency higher than the subcarrier frequencies, wherein the subcarriers are grouped into frequency subbands, and wherein at least one subband is scalable with at least one subband parameter, wherein a subband parameter is in particular a subcarrier spacing, and wherein in at least one subband at least two different parameters, in particular subcarrier spacings, can be used, the device comprising:
a memory storing computer readable instructions; and
a processor configured to execute the computer readable instructions which configure the processor to,
receive at least one service request for the provision of at least one service, wherein the received service request includes information related to the at least one subband parameter;
align for at least a first period of time the at least one subband parameter of the scalable subband with at least one corresponding subband parameter of a corresponding scalable subband used or to be used by a second radio module;
allocate for the received service request at least one of a time-frequency resource linked with the at least one of the at least one scalable subband with an aligned subcarrier parameter suitable to provide the service request; and
map data to be transmitted and related to the service request to subcarriers of a subband corresponding to the allocated time-frequency resource.

2. The device according to claim 1, wherein the computer readable instructions configure the processor to:
determine the data to be transmitted to a user equipment,
allocate the determined time-frequency resource,
modulate the data with a selected carrier configuration, in particular the at least one subband parameter, and
transmit the data via the allocated time-frequency resource.

3. The device according to claim 1, wherein the computer readable instructions configure the processor to:
receive the data via a time-frequency resource; and
de-modulate the received data with a selected carrier configuration, in particular the at least one subband parameter.

4. The device according to claim 1, wherein the computer readable instructions configure the processor to:
receive aligned carrier configurations, in particular the at least one aligned subband parameter, used by a further device from the device, a coordinator device, or both.

5. The device according to claim 1, wherein aligned carrier configurations in particular the at least one aligned subband parameter, are at least partly statically linked with the plurality of time-frequency resources.

6. The device according to claim 1, wherein the computer readable instructions configure the processor to:
determine an alignment priority; and
align a plurality of carrier configurations in dependence on the alignment priority.

7. The device according to claim 6, wherein the computer readable instructions configure the processor to:
determine the alignment priority in dependence on the service request, a transmission mode for the data, a received capability, or combination thereof.

8. The device according to claim 6, wherein the service request comprises a signal-to-noise ratio from a user equipment, wherein the computer readable instructions configure the processor to:
determine the alignment priority in dependence on the received signal-to-noise ratio.

9. The device according to claim 1, wherein the computer readable instructions configure the processor to:
determine a plurality of carrier configurations, in particular a plurality of subband parameters,
sort the plurality of carrier configurations, in particular the plurality of subband parameters, in a frequency direction according to a sorting scheme, the sorting scheme related to a parameter of the carrier configurations.

10. The device according to claim 1, wherein the service request is received during a connection setup of a user equipment.

11. The device according to claim 1, wherein the service request is received after a connection setup of a user equipment.

12. A radio communications network comprising:
the device according to claim 1, and
a second device.

13. The radio communications network according to claim 12 comprising a user equipment which is configured to:
transmit the service request to the device and the second device,
receive first data from the device via a first time-frequency resource,
receive second data from the second device via a second time-frequency resource,
de-modulate the first data according to a first carrier configuration, in particular a first subband parameter, de-modulate the second data according to a second carrier configuration, in particular a second subband parameter.

14. A coordinator device for a radio communications network, in which data to be transmitted is mapped on subcarriers and in a radio module subsequently up-converted to a radio frequency higher than frequencies of the subcarriers, wherein the subcarriers are grouped into frequency subbands, and wherein at least one subband is scalable with at least one subband parameter, wherein a subband parameter is in particular a subcarrier spacing, and wherein in at least one subband at least two different parameters, in particular subcarrier spacings, can be used, wherein the coordinator device comprises:
a memory storing computer readable instructions; and
a processor configured to execute the computer readable instructions which configure the processor to,
receive at least one service request, at least one alignment request or both from at least one device,
align for at least a first period of time the at least one subband parameter of the scalable subband with at least one corresponding subband parameter of a corresponding scalable subband used or to be used by a radio module of the at least one device in dependence on the at least one service request, the at least one alignment request, or both, and
transmit the at least one aligned subband parameter to the plurality of devices.

15. A radio communications network comprising:
the device according to claim 1; and
a radio communications device including
a second memory storing second computer readable instructions, and a second processor configured to execute the second computer readable instructions which configure the second processor to
transmit at least one service request for the provision of at least one service to the device, wherein the at least one service request includes information related to the at least one subband parameter, and
receive data related to the at least one service request.

16. The radio communications network according to claim 15, wherein the radio communications device further comprises a transceiver and a radio module, and
wherein the second computer readable instructions configure the second processor to:
generate the at least one service request during a connection setup,
wherein the at least one service request is modulated by the transceiver of the radio communications device and transmitted via the radio module of the radio communications device.

17. The radio communications network according to claim 16, wherein the radio module of the radio communications device is configured to receive an indication from the device, and
wherein the radio communications device further comprises an indicator configured to determine carrier configurations in dependence on the received indication.

18. The radio communications network according to claim 17, wherein the radio module is configured to receive first data and second data via respective time frequency resources, and
wherein the first and second data are de-modulated by respective de-modulators using the carrier configurations, respectively.

* * * * *